(12) United States Patent
Beholz

(10) Patent No.: US 7,901,603 B1
(45) Date of Patent: Mar. 8, 2011

(54) PROCESS FOR PRODUCING ADHESIVE POLYMERIC ARTICLES FROM EXPANDED FOAM MATERIALS

(75) Inventor: Lars Guenter Beholz, Flint, MI (US)

(73) Assignee: Lars Guenter Beholz, Flint, MI (US)

( * ) Notice: Subject to any disclaimer, the term of this patent is extended or adjusted under 35 U.S.C. 154(b) by 914 days.

(21) Appl. No.: 11/157,639

(22) Filed: Jun. 21, 2005

Related U.S. Application Data

(60) Provisional application No. 60/580,714, filed on Jun. 21, 2004.

(51) Int. Cl.
*C08F 8/06* (2006.01)

(52) U.S. Cl. ...... 264/48; 264/82; 427/248.1; 427/255.28

(58) Field of Classification Search .................. 427/133, 427/207.1, 248.1, 255.28; 264/41, 48, 82, 264/328.1
See application file for complete search history.

(56) References Cited

U.S. PATENT DOCUMENTS

| | | | |
|---|---|---|---|
| 2,668,134 A | 2/1954 | Horton | |
| 3,235,426 A | 2/1966 | Bruner | |
| 3,553,085 A | 1/1971 | Heymann | |
| 3,561,995 A | 2/1971 | Wu | |
| 3,660,293 A | 5/1972 | Maguire et al. | |
| 3,686,016 A | 8/1972 | Maguire et al. | |
| 3,689,303 A | 9/1972 | Maguire et al. | |
| 3,695,915 A | 10/1972 | Morris | |
| 3,730,757 A | 5/1973 | Knorre | |
| 3,869,303 A | 3/1975 | Orlov et al. | |
| 3,888,702 A | 6/1975 | Kujaawa et al. | |
| 4,086,128 A | 4/1978 | Sugio et al. | |
| 4,386,175 A | 5/1983 | Kuramochi et al. | |
| 4,405,760 A | 9/1983 | Howard, Jr. et al. | |
| 4,448,811 A | 5/1984 | Doty et al. | |
| 4,724,057 A | 2/1988 | Ebisawa et al. | |
| 4,800,053 A * | 1/1989 | Bauman et al. | ............... 264/83 |
| 4,810,434 A | 3/1989 | Calnes | |
| 4,835,016 A | 5/1989 | Rosty et al. | |
| 4,952,361 A | 8/1990 | Cree | |
| 5,053,256 A | 10/1991 | Haag | |
| 5,077,082 A | 12/1991 | Katoh et al. | |
| 5,143,592 A | 9/1992 | Toro | |
| 5,198,096 A | 3/1993 | Foust et al. | |
| 5,232,604 A | 8/1993 | Swallow et al. | |
| 5,242,544 A | 9/1993 | Itoh et al. | |
| 5,273,789 A | 12/1993 | Shinonaga et al. | |
| 5,442,042 A | 8/1995 | Zelner et al. | |
| 5,585,187 A | 12/1996 | Shinonaga et al. | |
| 5,670,582 A | 9/1997 | Chung et al. | |
| 5,872,190 A | 2/1999 | Gutowski et al. | |
| 6,066,370 A | 5/2000 | Blees | |
| 6,077,913 A | 6/2000 | Beholz | |
| 6,100,343 A | 8/2000 | Beholz | |
| 6,217,687 B1 | 4/2001 | Shibata et al. | |

* cited by examiner

*Primary Examiner* — Monica A Huson
*Assistant Examiner* — Galen Hauth
(74) *Attorney, Agent, or Firm* — Young Basile Hanlon & MacFarlane, P.C.

(57) ABSTRACT

Herein is disclosed a method for modifying the surface adhesion characteristics of expanded foams and beads or other expanded structures or components formed therefrom, whereby the expanded foams and beads or other expanded structures or components formed therefrom, are contacted with a composition containing at least one oxidizing agent and an activator. The oxidizing agent in the composition is present in a kinetically degrading state capable of producing at least one chemical intermediate that is reactive with the expanded foams and beads or other expanded structures or components wherein the expanded foams and beads or other expanded structures or components formed therefrom, are maintained for an interval sufficient to produce or modify functional groups in the polymeric substrate/virgin polymeric material. The oxidizing agent of choice is a halogenated bivalent oxygen compound. An activator comprised of one or more inorganic acids, inorganic acid precursors, organic acids or derivatives thereof or combinations thereof activate the oxidizing agent.

7 Claims, No Drawings

PROCESS FOR PRODUCING ADHESIVE POLYMERIC ARTICLES FROM EXPANDED FOAM MATERIALS

This application claims the benefit of the Jun. 21, 2004 filing date of U.S. Provisional Application No. 60/580,714, the contents of which are incorporated herein in their entirety.

The present invention relates to a process for improving the adhesion characteristics of expanded foams and beads or other expanded structures and resulting materials using an oxidizer composition in conjunction with acidic activator.

Polymeric materials provide excellent and versatile mechanical qualities and find use in a wide variety of applications. In certain instances, it is necessary to coat the surface of polymeric materials to meet aesthetic requirements or to provide a protective surface to help the polymeric substrate withstand degradation. In other circumstances, it would be desirous to adhere plastic to other plastic or to make plastic coatable. These applications have been problematic due to generally poor surface adhesion qualities exhibited by various polymeric substrate materials. Poor surface adhesion is also problematic in situations in which other laminates, films or metallic layers are to be imparted onto the polymeric material. Situations can also include bonding of one polymer substrate to another recycled or regrind polymeric material or to non-polymeric substrates. The difficulty in providing a paintable polymeric surfaces has not only led to a variety of activities directed toward promoting adhesion through the use of various adhesion promoters but has resulted in the development of expensive polyolefin compositions that are more receptive to adhesion. These costly substrates in conjunction with adhesion promoters such as flame treatment, corona discharge and organic adhesion promoters are currently the industry standard.

Treatment of polyolefin materials for adhesive bonding using a solution containing sulfuric acid in the presence of either lead dioxide, potassium iodate or ammonium persulfate is taught in U.S. Pat. No. 4,835,016 to Rosty et al. The Rosty reference also discusses the use of a solution containing bleach and detergent. In order to be effective, the Rosty reference teaches that the polymeric samples must be submersed in the prescribed solution for several days. Such protracted exposure is simply not practical in many treatment operations. Furthermore, the Rosty reference did not teach adhesion promotion on recycled or regrind polymeric substrates.

In U.S. Pat. No. 5,053,256 to Haag, a method for improving adhesion of paints to polydicyclopentadiene is proposed. A solution containing sodium hypochlorite and, preferably, a detergent is applied to the polymer by wiping. The solution is allowed to remain on the polymer surface for a 40 minutes interval and is then washed off. Polydicyclopentadiene presents a unique and exotic polymeric structure. Without being bound to any theory, it is believed that the large number of unsaturated carbon-carbon linkages in the cyclic functionalities provides a material uniquely susceptible to interaction with hypochlorite compounds. Unfortunately, the method described in Haag has not been readily adaptable to other more commonplace polymers. Again, the Haag reference did not teach adhesion promotion to substrates prepared from recycled or regrind polymer.

In U.S. Pat. Nos. 6,100,343 and 6,077,913 and Canadian Pat. No. 2,325,732 to Beholz, a method for improving adhesion of paints, glues, laminates and the like to polymeric substrates is described. A solution containing an oxidizer, such as bleach, and an organic acid, such as acetic acid, is contacted with the surface to be treated. Although the adhesion is imparted to the objects surface quickly and with ease, the method described by Beholz is limited in that it also did not teach the use of this method for treatment of substrates comprised of very inexpensive recycled or regrind material.

During fabrication of polymeric articles the polymer or polymer composition is heated to provide a polymer melt that may be injection molded or otherwise fabricated into an article for use. This heating to form a melt can be quite substantial and variable depending on equipment fitness and process and shape requirements. For example, a gate that is partially blocked or is distant from the melt polymer source may need to maintain a greater temperature than the plastic is designed to withstand so that proper polymer flow characteristics may be maintained. This can lead to substantial oxidation of the polymeric material and in extreme cases leads to discoloration and even degradation of the polymeric material. Thus, once a polymeric object has been formed, ground up and fabricated into a second article, the polymer comprising the second article is more oxidized then it was when fabricated into the first article. Often too, manufacturers will add substantially greater amounts of antioxidants, and the like, before the second fabrication to reduce further thermal degradation and oxidation of the polymer. This further alters to polymer composition and properties. Finally, there also exists the possibility that the polymer may be reprocessed numerous times providing with each melt greater and greater degrees of oxidation.

SUMMARY OF THE INVENTION

Disclosed herein is a method for improving surface adhesion characteristics of expanded foams and beads and materials prepared therefrom wherein the expanded foams and/or beads to be treated are contacted with a composition containing at least one oxidizing agent and an activator. The oxidizing agent in the composition is present in a kinetically degrading state capable of producing at least one chemical intermediate that is reactive with the expanded foams and beads. Contact between the composition containing the oxidizing agent and activator and the expanded foams and beads, is maintained for an interval sufficient to modify functional groups present in the surface of the polymeric substrates to be treated. The oxidizing agent of choice is a halogenated bivalent oxygen compound, particularly one capable of a controlled rate of oxidation and activation to yield the desired kinetically degrading state. Activation may occur by any suitable mechanical or chemical mechanism by an activator agent or mixture containing an inorganic acid, inorganic acids, inorganic acid precursors, organic acids, organic acid precursors and combinations thereof. The activator agent or agent combination may be present in the composition upon initial contact with expanded foams and beads or may be added to the composition subsequent to initial contact with the polymeric substrate.

DETAILED DESCRIPTION

This invention is predicated upon the unexpected discovery that the adhesion characteristics of expanded foams and beads can be significantly enhanced by processing the polymeric substrate with a solid, fluid and/or vaporous material which contains at least one oxidizing agent that is subsequently activated using an inorganic acid. While such processes had been proposed for resin-based polymeric substrates, heretofore the unique nature and chemistry of expanded foams and their precursors contributed to the belief that such materials were not fully amenable for such treatment. The oxidizing agent is a bivalent oxygen compound present in the fluid material in a kinetically degrading state. The oxidizing agent is capable of producing at least one chemical intermediate that is significantly reactive with functionalities present in the expanded foams and beads. The kinetic degradation of the oxidizing agent is enhanced or augmented by the presence of an activator agent. The activator agent of choice is one containing a chemical compound that is an inorganic acid, inorganic acids, inorganic acid precursors, organic acid(s), organic acid precursors and mixtures thereof.

As used herein, the term "activator" refers to chemical entity or entities that accelerate placement of the oxidizer or oxidizers into a kinetically degrading state. More specifically, disclosed herein are activators that employ the use of inorganic acid(s), inorganic acid precursors, organic acid(s), organic acid precursors, synthetic equivalents thereof and mixtures thereof.

As used herein, the term "kinetically degrading state" is defined as a non-equilibrium state in which the oxidizing agent, specifically the halogenated bivalent oxygen compound, experiences a change in oxidation state over time with the oxidizing agent having its highest concentration at a point closest to the initiation of the reaction process with a concomitant decrease in concentration of this species over time. The concentration of oxidizing agents having lower or lowest oxidation states is at its lowest at the outset of the method of the present invention with a concomitant increase in this species over time. The kinetically degrading state of the oxidizing agent produces at least one chemical intermediate that is reactive with the polymeric substrate. The chemical intermediate may be stable, unstable or transient. Stable intermediates are defined herein as those that are readily isolatable for quantification and analysis. Unstable intermediates are defined herein as those that cannot be isolated for such quantification and analysis. Transient intermediates are considered those that react rapidly with the polymeric substrate or other components present in the system.

As used herein, the term "oxidizing agent" is a chemical compound which readily gives up oxygen, accomplishes the removal of hydrogen from another, preferably organic, compound or serves to attract electrons to accomplish the eventual hydrogen removal from the target compound. The term "controlled rate of oxidation" as used herein is defined as a chemical reaction rate that proceeds with efficient evolution of quantities of reactive intermediate sufficient to interact with the polymeric substrate. The oxidation process proceeds without generation of excessive quantities of by-product such as devolved gaseous product or the like.

As used herein, the term "expanded foams and beads" is defined as any expanded foams and beads or other expanded structures or combinations thereof including but not limited to those containing any or any mixture, combination, or composition of addition polymers, condensation polymers, thermoplastic elastomers, and co-polymers. Additional polymers comprise the following: polyethylene, polypropylene, polystyrene, polyisobutylene, polyvinyl chloride, polyacrylonitrile, polymethyl acrylate, polymethyl methacrylate, polytetrafluoroethylene, polyformaldehyde, polyacetaldehyde, polyisoprene, and mixtures thereof. Condensation polymers comprise the following: polyamides, polyesters, polyurethanes, polysiloxanes, polyphenolformaldehydes, ureaformaldehydes, melamine formaldehydes, celluloses, polysulfides, polyacetates, polycarbonates, and mixtures thereof. Thermoplastic elastomers comprise the following: styrene-isoprene-styrene, styrene-butadiene-styrene, copolyesters, copolyester ethers, silicone-polyamides, silicone-polyesters, silicone-polyolefins, silicone-styrenes, aromatic polyetherurethanes, alpha cellulose filled ureas, polyvinyl chloride-acetates, vinylbutyrals, and mixtures thereof. Co-polymers comprise the following: polyester-polyethers, polyether-polysiloxanes, polysiloxane-polyamides, polyesteramides, copolyamides, nylons, and mixtures thereof; and mixtures thereof.

"Polystyrene foam" as used herein refers to cellular plastics made from polystyrene typically by incorporation of a volatile blowing agent or an inert gas such as nitrogen into polystyrene beads as they are polymerized or afterward. The beads are first pre-expanded and allowed to rest for a suitable interval, then molded in a closed steam-heated mold to produce closed-cell foams.

"Phenolic foams" as used herein are typically the nonsyntactic type foams generally referred to as reaction-type materials generated by heating a water-containing liquid phenolic resin, a blowing agent, an acid catalyst, and a surfactant. "Epoxy foams" as used herein are typically chemical-foam compositions containing a resin, curing agent, blowing agent, wetting agent, and, as necessary, inert compounds to dissipate exothermic heat generated during curing.

Suitable expanded polystyrene materials can be produced from thermoplastic polymer particles. The term "thermoplastic polymer particles" is used generally in the present discussion to include particles made by aqueous suspension type polymerization, commonly known as beads or pearls, comminuted particles such as those obtained by crushing and grinding slabs of mass polymerized thermoplastic materials, and pellets obtained by extruding thermoplastic polymeric materials and cutting the extrudate into small particles generally referred to as pellets.

Most preferable materials include but are not limited to expanded polypropylene, porous expanded polypropylene, low emission expanded polypropylene, cross-linked expanded polypropylene and porous closed cell composites as well as laminated expanded materials.

Exemplary foams and beads include but are not limited to: those containing any or any mixture, combination, or composition of the following additives: plasticizers, elastomers, plastomers, reinforcement materials including but not limited to calcium carbonate, mica, fiberglass, nano-materials, fire retardants, UV stabilizers, colorants, or any other chemical, polymer or material formulated to modify the expanded beads and foams.

In the method disclosed herein, expanded foams and beads are generally those having hydrogens attached to carbon atoms characterized by large percentages of covalent carbon bonds; typically alkalene linkages present throughout the polymeric lattice. Without being bound to any theory, it is believed that the presence of large numbers of covalent bonds in the polymeric lattice renders the recycled or regrind polymeric material relatively unreactive and difficult to make adhesive. The expanded foams and beads employed in the method disclosed herein may be either thermosetting or thermoplastic materials. Non-limiting examples of suitable polymers include addition polymers selected from the group consisting of polyolefins, substituted polyolefins, and polyolefin blends. In certain instances the desired polyolefins are addition polymers selected from the group consisting of polyethylene, polypropylene polyisobutylene, polystyrene, polyisoprene, polyethylene terephthalate, polybutylene terephthalate, polyvinyl chlorides, polyvinylidine chlorides, polyacrylonitriles, polyvinylacetates, and mixtures thereof. It has been found that the process of the present invention is particularly efficacious when performed on these recycled addition polymers. Adhesive properties inherent in certain recycled polyolefin addition polymers are particularly low.

Suitable materials include but are not limited to expanded polypropylene, porous expanded polypropylene, low emission expanded polypropylene, cross-linked expanded polypropylene and porous closed cell composites as well as laminated expanded materials.

Exemplary foams and beads include but are not limited to those containing any or any mixture, combination, or composition of the following additives: plasticizers, elastomers, plastomers, reinforcement materials including but not limited to calcium carbonate, mica, fiberglass, nano-materials, fire retardants, UV stabilizers, colorants, or any other chemical, polymer or material formulated to modify the polymer beads, foams or other expanded structures or combinations thereof and the like.

While the process disclosed herein is particularly directed to expanded foams and beads, it is to be understood that the process can also be employed to increase adhesive properties of other cellular plastics that are generally recognized as more paintable. These latter polymers include halogenated polyalkyls and polyalkyl acrylates, selected from the group consisting of polyvinyl chloride, polymethyl methacrylate, polymethyl acrylate, and mixtures thereof.

Expanded foams and beads prepared from polyethylenes composed of substituted or unsubstituted alkalene monomers may also be treated by the process of the present invention. Non-limiting examples of substituted expanded foams and beads may also include polytetrafluoroethylene, polytrichlorofluoroethylene and the like. Finally, other addition polymers can successfully be treated. This includes materials such as polyformaldehyde, polyacetaldehyde, polyisoprene and the like.

Expanded foams and beads prepared from condensation polymers, which exhibit marked increases in adhesive ability, include polyesters selected from the group consisting of polyethylene terephthalate, polybutylene terephthalate, and mixtures thereof. Other polymeric materials which can be treated by the process of the present invention can be condensation polymers such as those selected from the group consisting of polyamides, polyesters, polyurethanes, polysiloxanes, polyphenolformaldehydes, urea formaldehydes, melamine-formaldehydes, cellulose, polysulfides, polyacetates, polycarbonates, and mixtures thereof.

Various other expanded foams and beads include those prepared from polymers listed in Modern Plastics, "Appendix: Numerical Specification Index," Mid-November 1995, at B-143-B-144.

It is also within the purview of this disclosure that the expanded foams and beads and cellular plastic prepared therefrom can be a blend containing as a major constituent any of the enumerated polymers.

It is to be understood that various expanded foams and beads have varying degrees of adhesion ability. Thus, the method disclosed herein can be efficaciously employed for improving the adhesion characteristics of expanded foams and beads with relatively poor initial adhesion characteristics such as polyolefin polymeric substrates, polyester polymeric substrates, and mixtures thereof. The specific expanded foams and beads for which the adhesion improvement method disclosed herein shows significant results are expanded foams and beads from the group that includes at least one of polyethylene, polypropylene, polystyrene, polyisobutylene, polyethylene terephthalate, polybutylene terephthalate. It is anticipated that polymeric substrates advantageously improved by the process disclosed herein are those that contain one or more of the enumerated polymers as a major constituent thereof. It is also within the purview of this disclosure that the expanded foams and beads and resultant cellular plastics may include other compounds such as plasticizers, fillers, oxidation stabilizers, colorants, and the like compatible with the adhesion improvement method of the present invention.

In the method disclosed herein, at least a portion of the surface area of the polymeric substrate is contacted with a fluid material containing at least one oxidizing agent. It is anticipated that the method disclosed herein can be successfully implemented on expanded foams and beads and resultant cellular plastics which have been processed into a finished or intermediate part generally considered ready for painting or other processing for which increased adhesion characteristics are desired. Examples of such processes include, but are not limited to, joining, laminating and the like. It is within the purview of this invention that the entire polymeric substrate be contacted with the fluid material containing the oxidizing agent. However, it is also within the purview of this disclosure that the expanded foams and beads and resultant cellular plastics be masked or otherwise prepared so that only the desired portion of the surface area of the polymeric substrate be so treated.

The fluid material containing the oxidizing agent may be any liquid or gaseous composition that is capable of containing and conveying the oxidizing agent into contact with the polymeric substrate surface or polymeric substrate surface and interior to be treated. Thus, the fluid material can be an aqueous solution containing sufficient quantities of the oxidizing agent to effect the appropriate chemical reaction in the desired manner at the desired rate.

The oxidizing agent is a material that is capable of kinetically degrading from its highest oxidized state into lower intermediates in a controlled or controllable reaction mechanism. The oxidizing agent may also be a material that can be rendered capable of such kinetic degradation in a controlled rate of reaction.

The oxidizing material employed is a compound that will generally evolve halogen or a halogen analog at a controlled rate, particularly when brought into contact with materials containing acidic functionality. As used herein, the term "halogen or a halogen analog" is defined as one of the electronegative elements of Group VIIA of the Periodic table or a material that will perform the same or similar function in the process of the present invention. Halogens preferably are selected from the group consisting of chlorine, bromine, iodine and mixtures thereof. Halogen analogs preferably are selected from the group consisting of boron, nitrogen and mixtures thereof.

In the process disclosed herein, suitable oxidizing agents are halogenated bivalent oxygen compound(s) which is selected from the group consisting of oxycompounds of chlorine, oxycompounds of bromine, oxycompounds of iodine, oxycompounds of nitrogen, and mixtures thereof. Without being bound to any theory, it is believed that the selected oxidizing compounds kinetically degrade into an intermediate.

Oxycompounds of chlorine which can be utilized as the bivalent oxygen oxidizing agent are selected from the group consisting of hypochlorous acid, alkali metal salts of hypochlorous acid and hydrates thereof, alkaline earth metal salts of hypochlorous acid and hydrates thereof, perchloric acid, alkali metal salts of perchloric acid and hydrates thereof, alkaline earth metal salts of perchloric acid and hydrates thereof, chloric acid, alkali metal salts of chloric acid and hydrates thereof, alkaline earth metal salts of chloric acid and hydrates thereof.

Oxycompounds of bromine which can be utilized as the bivalent oxygen oxidizing agent are selected from the group consisting of hypobromous acid, alkali earth metal salts of hypobromous acid and hydrates thereof, alkaline earth metal salts of hypobromous acid and hydrates thereof, bromic acid, alkali metal salts of bromic acid and hydrates thereof, alkaline earth metal salts of bromic acid and hydrates thereof.

Oxycompounds of iodine which can be employed as the bivalent oxygen compound of the present invention are selected from the group consisting of iodic acid, alkali metal salts of iodic acid and hydrates thereof, alkaline earth metal salts of iodic acid and hydrates thereof, periodic acid, alkali metal salts of periodic acid and hydrates thereof, alkaline earth metal salts of periodic acid and hydrates thereof.

Oxycompounds of boron that can be employed as the bivalent oxygen compound of the present invention are selected from the group consisting of boric acid, alkali metal salts of boric acid and hydrates thereof, alkaline earth metal salts of boric acid and hydrates thereof, perboric acid, alkali metal perborates and hydrates thereof, alkaline earth metal perborates and hydrates thereof.

Oxycompounds of nitrogen which can be employed as the bivalent oxygen oxidizing agent are selected from the group consisting of nitric acid, alkali metal salts of nitric acid and hydrates thereof, alkaline earth metal salts of nitric acid and hydrates thereof.

The oxycompound of choice is preferably a compound or mixture of compounds that will kinetically degrade in a controlled, essentially steady manner to provide chemical intermediates which are reactive with the polymeric substrate.

Preferred oxycompounds employed as the oxidizing agent in the process disclosed herein may include at least one of hypochlorous acid, alkali metal salts of hypochlorous acid, hydrates of hypochlorous acid, alkaline earth metal salts of hypochlorous acid, hydrates of alkaline earth metal salts, and mixtures thereof. Non-limiting examples of oxidizing agents include at least one of hypochlorous acid, calcium hypochlorite, sodium hypochlorite, calcium hypochlorite tetrahydrate, lithium perchlorate, lithium perchlorate trihydrate, magnesium perchlorate, magnesium perchlorate dihydrate, potassium chlorate, sodium perchlorate, lithium nitrate, magnesium iodate tetrahydrate, magnesium nitrate hexahydrate, nitrosalicylic acid, sodium perborate tetrahydrate with oxidizing agents from the group including at least one of hypochlorous acid, calcium hypochlorite, sodium hypochlorite, lithium perchlorate, magnesium perchlorate, sodium perchlorate, and potassium chlorate being desirable. One non-limiting example of suitable oxidizing agents includes at least one of sodium hypochlorite, calcium hypochlorite and calcium hypochlorite tetrahydrate.

The oxidizing agent may be present in aqueous solution in a concentration sufficient to provide material which can kinetically degrade to an intermediate which will interact with the polymeric substrate with which it is brought into contact.

In the process disclosed herein, the oxidizing agent is maintained in an aqueous solution at a concentration between about 0.25% and 25% by volume, with an oxidizing agent concentration between about 0.5% and about 5.25% by volume being preferred and an oxidizing agent concentration between about 2.6% and about 5.25% by volume being most preferred. It should be noted that an oxidizer concentration of 5.25% is the concentration of bleach. It is also to be understood that the oxidizing agent disclosed herein may be used in solid form, and/or as a solid(s) suspension.

Other liquid or gaseous material can be employed as an activating agent for the oxidizing agent, provided that the liquid or gaseous material does not adversely interact with the oxidizing agent or polymeric substrate. Aqueous solutions may be preferred for purposes of economy and handling ease. However, it is also to be understood that the activating agent of the present invention may be used in solid form, and/or as a solid(s) suspension.

The oxidizing agent may be employed in combination with a suitable activating agent capable of reacting with the oxidizing agent to produce the intermediate species which is, in turn, reactive with the expanded foams and beads or other expanded structures or combinations thereof and the like or structures prepared therefrom. The activating agent is an organic material or derivative thereof having at least one carboxylic acid functionality or derivative thereof.

The activating agent employed in the process disclosed herein is at least one of an inorganic acid or acids and inorganic acid precursors and may be comprised of any inorganic acid type including but not limited to binary acids, Bronsted acids, hydrohalic acids, oxyacids such as hypohalous acids (HXO), Halous Acids ($HXO_2$), Halic Acids ($HXO_3$), Perhalic Acids ($HXO_4$), Paraperhalic Acids ($H_5XO_6$), Lewis acids, mineral acids, polyprotic acids, ternary acids, or weak or strong inorganic acids or acid salts and acids formed from the class of pseudohalides and pseudohalogens. Examples of inorganic acids and their precursors include but are not limited to the following: Arsenic, Arsenious, o-Boric, Carbonic, Chromic, Germanic, Hydrocyanic, Hydrogen Sulfide, Hydrogen Peroide, Hypobromous, Hypochlorous, Hypoiodous, Iodic, Nitrous, Periodic, o-Phosphoric, Phosphorous, Pyrophosphoric, Selenic, Selenious, m-Selicic, o-Selicic, Sulfuric, Sulfurous, Telluric, Tellurous, Tetraboric, and the like. Examples of inorganic acids and their precursor formulas include but are not limited to the following: HF, HCl, HBr, $H_1$, $H_2SO_3$, $H_2SO_4$, $HNO_2$, $HNO_3$, HFO, $HFO_2$, $HFO_3$, $HFO_4$, $H_5FO_6$, $HClO_2$, $HClO_3$, $HClO_4$, $H_5ClO_6$, $HBrO_2$, $HBrO_3$, $HBrO_4$, $H_5BrO$, $HIO_2$, $HIO_3$, $HIO_4$, $H5IO_6$, $H_2SeO_3$, $H_2SeO_4$, $H_3PO_3$, $H_3PO_4$, $SO_2$, $HSO_3^-$, $H_2SO_3$, $HSO_4^-$, $H_2SO_4$, $H_2S_2O_3$, $HNO_3$, $NO_2$, $N_2O_5$, $HMnO_4$, $H_2Cr_2O_7$, $PCl_3$, $PCl_5$, $POCl_3$, $P_4O_{10}$, $H_3PO_3$, $H_3PO_4$, HCN, HCNO, HNCO, HSCN, HSeCN, HTeCN, $HN_3$, $HSCSN_3$, $H_2S$, $H_2Se$, $H_2Te$, $AlCl_3$, $FeCl_3$, $HSiO_3$, $H_4SiO_4$, $H_6Si_2O_7$, $BF_3$-etherate, $BCl_3$, $SnCl_4$, $H_2CO_3$, $CO_2$, and the like.

The organic acid or acids, organic acid precursors or synthetic equivalents of mixtures thereof have as a generalized formula:

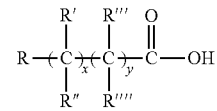

wherein x and y are integers between 0 and 20 inclusive, with the sum of x and y being an integer of 20 or less, wherein R is a functionality selected from the group consisting of substituted or unsubstituted aromatic hydrocarbon groups, branched or unbranched alkyl groups, the alkyl group having between 1 and 27 carbon atoms, and mixtures thereof, and wherein each variable R', R", R'" and R"" is a functionality selected from the group consisting of hydrogen, amines, hydroxyl, phenyl, phenol radicals, and mixtures thereof, each of the above-mentioned R variable functionalities being chosen independently of the other R variable functionalities, and wherein R" may also be selected from the group consisting of anhydrides, halide salts, selenic acid salts, perchloric acid salts, boric acid salts, and mixtures thereof; and wherein the dicarboxylic acid has the general formula:

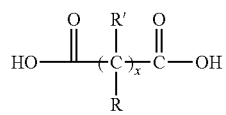

wherein x is an integer between 1 and 20 inclusive and R and R' are functionalities selected from the group consisting of hydrogen, hydroxyl radicals, amines, phenyl radicals and mixtures thereof.

Activator compositions may also be combinations of inorganic and organic components and include still other chemicals not directly involved in reacting with the polymer surface. Such other chemicals include but are not limited to stabilizing agents, agents to reduce chemical damage to equipment, agents to reduce toxicity and the like.

Some other additional suitable "acids" may include hydroxylamine hydrochloride, phosphorous pentachloride, phosphorous pentoxide, phosphoryl chloride, sulfurous acid, sulfuryl chloride, thionyl chloride, and, less preferably, phenols and catechols (these are both weakly acidic).

It is to be understood that the numbers mentioned above in both formulae for the number of carbons represented by "x" and "y" represent most "simple" molecules. However, it is to be understood that these formulas are illustrative, and the present invention is not to be limited thereto. Within the purview of the present invention, there is no real limit on the number of carbons represented by "x" and "y." In the extreme case of polymers, x and y would simply be between 2000 and 500,000. Also, in the instance of polymers, the number and distribution of x and y could vary greatly from ordered to random and from alternating to block.

An example of a polymer that may degrade in water to yield an acid suitable for use as the activating agent includes, but is not limited to, polyphosphoric acid. Examples of suitable acidic polymers include, but are not limited to, poly (melamine-co-formaldehyde)s, polyacrylic acids, and salts thereof.

Further, regarding each of the R variables mentioned hereinabove, ie. R, R', R", etc., it is to be understood that the R groups are not intended to be limited to the above-identified species. For example, in a random branched polymer, the R groups may include a nearly infinite array; eg. the R groups may contain repeating ether linkages (such as in PEG), repeating amide linkages (such as in the polyamides), etc. The R groups may also contain combinations of any variety of functional groups. Another possibility is that one R group may be attached to another R group forming a ring. These rings may also contain functionality and branching. Furthermore, any of the branches in any of the aforementioned systems may be terminated with an additional functional group. A partial listing of functional groups that are commonly found in or at the end of molecules include: ethers, esters, amides, ketones, aldehydes, alcohols, nitrites, alkenes, alkynes, cyano groups, sulfur, sulfates, phosphor, phosphates, nitrogen, amines, nitro groups, as well as diazonium species etc. This presents a nearly infinite array of possibilities.

Suitable carboxylic acids include butyric acid, lactic acid, propionic acid, heptanoic acid, formic acid, and mixtures thereof. Derivatives of these mild carboxylic acids are also contemplated, as well as synthetic equivalents thereof. Specifically contemplated are acid anhydrides, acid chlorides, acid bromides and polyacids, such as heptanoic acid, butyric anhydride, heptanoic anhydride and the like. Examples of acid chlorides that can be effectively employed include palmitic chloride, fumeryl chloride, and the like.

Suitable dicarboxylic acids, acid derivatives, and synthetic equivalents thereof include dicarboxylic acids such as oxalic acid, malonic acid, succinic acid, glutaric acid, adipic acid, pimelic acid, maleic acid, and fumaric acid. It is within the purview of this invention that the activating agent be a mixture of these compounds. It is also within the purview of this invention that the activating agent be a derivative of dicarboxylic acid including, but not limited to, acid anhydrides, acid chlorides, acid bromides and polyacids. Particular examples of these include, but are not limited to materials such as acetic anhydride, oxalic acid dihydrate, acetile bromide, acetile chloride, 2-acetile benzoic acid, 4-acetile benzoic acid, bromoacetic acid, acetic acid, glacial acetic acid, vinegar, calcium oxylate, chlorobenzoyl chloride, 3-chlorobenzoyl chloride, citric acid, citric acid monohydrate, bibenzilazodicarboxylate, diglycolic acid, fumaric acid, furmeryl chloride, galic acid, galic acid monohydrate, oxalic acid, subasic acid, pyruvic acid, succinic acid, succinic anhydride, succinyl chloride, 5-sulfosalicylic acid, tannic acid, tartaric acid, and mixtures thereof.

An additional class of dicarboxylic acids includes the bridged carboxylic acids of the phthalate and succinimide types, such as terephthalic acid and succinimide.

It is to be understood that the amino acids and poly-amino acids form another class of acids contemplated as being effective activating agents. Suitable examples thereof include, but are not limited to aspartic acid and polyaspartic acid.

The activating agent of choice is one which, when added to the solution containing the oxidizing agent will result in the dissolution of the activating agent and dispersal throughout the solution. The addition of activating agent may also lead to an increase in solution temperature depending upon the particular activating agent employed and the amount added. Preferably, the amount and particular activating agent employed produces a rate of kinetic degradation of oxidizing agent which is manageable and yields a treatment solution which will provide for prolonged successful polymeric surface adhesion promotion. Ideally, the rate of kinetic degradation is one that will permit use of the treatment solution for intervals upwards of a day before replacement or recharging is required, with use intervals of seven to ten days being preferred. The interval during which the treatment solution is active will vary depending upon parameters such as temperature, the amount of polymeric substrate treated and the like. In the process disclosed herein, the primary activating agent is maintained in an aqueous solution at a concentration between about 0.02% and 10% by volume, with a primary activating agent concentration between about 0.2% and about 2% by volume being preferred. The amount of organic acid in the inorganic activator solution is at a concentration between about 0.02% and 10% by volume with the organic acid concentration between about 0.2% and about 2% by volume being preferred.

In the process disclosed herein, the activating agent material is preferably one that will promote dissolution of the activating material without liberation of undesirable gasses such as halogen gas or other unsuitable byproducts or VOCs. The amount of activating agent employed is that sufficient to produce reactive intermediate capable of adhering to and/or interacting with the expanded foams and beads or cellular plastics resulting therefrom. It is anticipated that the reactive intermediates react with the plastic substrate to add functionality that improves the adhesive properties of the expanded foams and beads and cellular plastics resulting therefrom-without unduly compromising polymeric performance.

Other compounds, although less preferred, may be used as the activating agent, including but not limited to potassium acetate, and hydrogen peroxide.

In the most preferred embodiment, the activating agent is selected from the group consisting of inorganic acid(s) or inorganic acid precursors and inorganic acid types including but not limited to binary acids, Bronsted acids, hydrohalic acids, oxyacids such as hypohalous acids (HXO), Halous Acids ($HXO_2$), Halic Acids ($HXO_3$), Perhalic Acids ($HXO_4$), Paraperhalic Acids ($H_5XO_6$), Lewis acids, mineral acids, polyprotic acids, ternary acids, or weak or strong inorganic acids or acid salts and acids formed from the class of pseudohalides and pseudohalogens. Examples of inorganic acids and their precursors include but are not limited to the following: Arsenic, Arsenious, o-Boric, Carbonic, Chromic, Germanic, Hydrocyanic, Hydrogen Sulfide, Hydrogen Peroide, Hypobromous, Hypochlorous, Hypoiodous, Iodic, Nitrous, Periodic, o-Phosphoric, Phosphorous, Pyrophosphoric, Selenic, Selenious, m-Selicic, o-Selicic, Sulfuric, Sulfurous, Telluric, Tellurous, Tetraboric, and the like. Examples of inorganic acids and their precursor formulas include but are not limited to the following: HF, HCl, HBr, $H_1$, $H_2SO_3$, $H_2SO_4$, $HNO_2$, $HNO_3$, HFO, $HFO_2$, $HFO_3$, $HFO_4$, $H_5FO_6$, $HClO_2$, $HClO_3$, $HClO_4$, $H_5ClO_6$, $HBrO_2$, $HBrO_3$, $HBrO_4$, $H_5BrO$, $HIO_2$, $HIO_3$, $HIO_4$, $H5IO_6$, $H_2SeO_3$, $H_2SeO_4$, $H_3PO_3$, $H_3PO_4$, $SO_2$, $HSO_3^-$, $H_2SO_3$, $HSO_4^-$, $H_2SO_4$, $H_2S_2O_3$, $HNO_3$, $NO_2$, $N_2O_5$, $HMnO_4$, $H_2Cr_2O_7$, $PCl_3$, $PCl_5$, $POCl_3$, $P_4O_{10}$, $H_3PO_3$, $H_3PO_4$, HCN, HCNO, HNCO, HSCN, HSeCN, HTeCN, $HN_3$, $HSCSN_3$, $H_2S$, $H_2Se$, $H_2Te$, $AlCl_3$, $FeCl_3$, $HSiO_3$, $H_4SiO_4$, $H_6Si_2O_7$, $BF_3$-etherate, $BCl_3$, $SnCl_4$, $H_2CO_3$, $CO_2$, and the like.

In another most preferred embodiment the carboxylic acid or acids has the general formula:

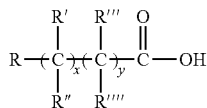

wherein x and y are integers between 0 and 20 inclusive, with the sum of x and y being an integer of 20 or less, wherein R is a functionality selected from the group consisting of substituted or unsubstituted aromatic hydrocarbon groups, branched or unbranched alkyl groups, the alkyl group having between 1 and 27 carbon atoms, and mixtures thereof, and wherein each variable R', R", R'" and R"" is a functionality selected from the group consisting of hydrogen, amines, hydroxyl, phenyl, phenol radicals, and mixtures thereof, each of the above-mentioned R variable functionalities being chosen independently of the other R variable functionalities, and wherein R" may also be selected from the group consisting of anhydrides, halide salts, selenic acid salts, perchloric acid salts, boric acid salts, and mixtures thereof; and wherein the dicarboxylic acid has the general formula:

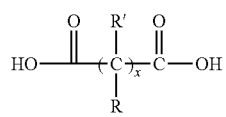

wherein x is an integer between 1 and 20 inclusive and R and R' are functionalities selected from the group consisting of hydrogen, hydroxyl radicals, amines, phenyl radicals and mixtures thereof.

Exemplary applications or uses of the expanded polymer foams. beads or cellular plastics resulting therefrom include but are not limited to: insulation, construction, structural, geological lining, drainage, cushioning, noise reduction, shrapnel absorption, blast containment, fire containment and retardant, packaging and the like. Expanded foam materials for these applications may be treated at any point in the fabrication of the end use product.

Exemplary products formed from the expanded polymer beads or foams include but are not limited to: Vehicle (aircraft, automotive, rail, trucking, marine, aerospace, agricultural equipment and the like) components include but are not limited to: seating, bumper cushions, interior and exterior structural, insulation, cushioning, safety and noise reduction components, HVAC components, tires and the like. Additional automotive components include but are not limited to door panels, center consoles, pillars, side impact panels, instrument panels, carpet underlayer/floor levelers, visors and headrests, ductwork insulation and the like. Geological products or component parts include but are not limited to: liners for sporting, athletic or play surfaces, liners or containment components for landfills, liners and containment components for water storage, containment, routing and transporting. Construction products or component parts include but are not limited to: thermal and acoustical insulation, floor cushioning, ceiling panels and the like. Home and building interior products or component parts include but are not limited to: office dividers, furniture components, cushioning for gymnasiums and the like. Military products or component parts include but are not limited to: protective linings in ship halls, in military vehicles, aircraft and the like, protective linings on ship exteriors, on military vehicles, aircraft and the like, helmets, protective clothing or clothing components, furniture components and the like. Marine products or component parts include but are not limited to: buoys, breakwaters, floatation devices, hull boards, acoustic panels, dock components, interior and exterior boat components and the like. Medical products or component parts include but are not limited to: medical device components, positioning device components, hospital furniture and equipment components, components in emergency vehicles and the like Packaging products or component parts include but are not limited to: packaging Industrial products or component parts include but are not limited to: Civil Engineering products or component parts include but are not limited to: acoustical barriers, safety equipment such as pylons, signs and markers, impact barriers and the like. Miscellaneous products or component parts include but are not limited to: toys, helmets, water treatment/filtration media, components in sky boots and other sportswear and equipment such as trampolines, luggage components, playscape components and the like. Expanded foam materials for these applications may be treated at any point in the fabrication of the end use product.

Paint adhesion is examined using test method ASTM D3359-78, wherein the painted surface is cross-hatched; a piece of transparent tape is secured to the surface; and the tape is peeled off at about a 90.degree angle. Paint adhesion is examined by a variation of test method ASTM D3359-78 wherein the painted surface will not cross-hatched. In the following experiments, the bath will be considered operative until subsequent painting (with 2 coats of RUST-OLEUM Gloss Protective Spray Enamel, Gloss Black 7779) and testing of sample pieces will reveal a drop of adhesiveness to paint of approximately 50% from a starting adhesiveness of >98% as measured qualitatively by visual inspection. The drop is anticipated to be generally sudden.

Although the exposure method described present process is that of dipping the expanded foams and beads or cellular plastics resulting therefrom into a bath containing the treatment solution, it is to be understood that the expanded foams and resulting cleeular plastics may be exposed to the treatment solution by any suitable method, including but not limited to spraying a heated treatment mist onto the polymer, spraying a treatment mist onto a heated polymer, and the like.

Some alternate methods for treating the expanded foams and beads and resulting cellular plastics are discussed hereinbelow. The expanded foams and beads may be treated at other times during their processing. The expanded foams and beads used in processing could also be treated at the polymer manufacturer prior to shipment to the OEM or other manufacturer.

It is believed that these concepts are inventive in that they may not only find utility in promoting adhesion in a more environmentally responsible manner, but may impart unexpected and inventive properties on the expanded foams and beads through polymer crosslinking, or by increasing polymer compatibility.

For example, treated expanded foams and beads may be prepared by submersing the material in a suitable solution of the inventive oxidizing agent and activating agent, under suitable conditions, until the polyolefin is wetted. The material may then be further processed, thereby treating the polyolefin material according to the present invention. The treated polyolefin material may then be mixed with previously incompatible polymers, thereby producing inventive copolymer blends upon processing.

The treated expanded foams and beads or cellular plastics may alternately be mixed with a reactive polymer, thereby forming inventive, highly crosslinked, strong structural polymers upon processing. Crosslinking of, for example, polyethylene, increases its strength properties and extends the upper temperature limit at which this plastic can be used.

The treated expanded foams and beads or resulting cellular plastics may alternately be mixed with several unlike polymers, thereby making them adhesively compatible.

Further, the treated expanded foams and beads may alternately be mixed with a reactive polymer and shipped prior to processing or after partial reaction. The inventive polymer blend may then be used as an inventive, highly crosslinked thermoset polymer.

The present invention provides an inventive, greatly improved chemical method for enhancing the adhesive properties of expanded foams and beads, for example, the surfaces of olefinic polymers such as polyethylene and polypropylene substantially without or with a greatly reduced use of organic acids. The inventive method includes, but is not limited to the following advantages: it is relatively non-toxic, highly effective, very fast and is environmentally friendly.

To further illustrate the effect of the adhesion promotion process's effect on recycled and regrind polymeric material, the following examples are given. It is to be understood that these examples are provided for illustrative purposes and are not to be construed as limiting the scope of the disclosure or any resulting invention.

The present disclosure also contemplates a method for improving adhesion characteristics of a polymeric material, comprising the steps of:

A. contacting particulate precursor material in the form of expanded foams and beads with a composition containing at least one oxidizing agent, wherein said oxidizing agent is a bivalent oxygen compound selected from the group consisting of oxycompounds of chlorine, oxycompounds of bromine, oxycompounds of iodine, oxycompounds of boron, oxycompounds of nitrogen and mixtures thereof, said oxidizing agent present in a kinetically degrading state which produces at least one chemical intermediate reactive with a polymeric substrate in a controlled reaction mechanism;

B. maintaining contact between the particulate precursor material in the form of expanded foams and beads and the oxidizing composition for an interval sufficient to impart at least one functional groups derived from the oxidizing agent into the polymeric particulate precursor material; and C. reacting said oxidizing agent with an activating agent which preferentially reacts with said oxidizing agent to produce said at least one intermediate reactive with the particulate polymeric precursor material substrate; wherein said activating agent is at least one of an inorganic acid- or inorganic acid precursors comprising any inorganic acid type including but not limited to binary acids, Bronsted acids, hydrohalic acids, oxyacids such as hypohalous acids (HXO), Halous Acids (HXO$_2$), Halic Acids (HXO$_3$), Perhalic Acids (HXO$_4$), Paraperhalic Acids (H$_5$XO$_6$), Lewis acids, mineral acids, polyprotic acids, ternary acids, or weak or strong inorganic acids or acid salts and acids formed from the class of pseudohalides and pseudohalogens, Arsenic, Arsenious, o-Boric, Carbonic, Chromic, Germanic, Hydrocyanic, Hydrogen Sulfide, Hydrogen Peroide, Hypobromous, Hypochlorous, Hypoiodous, Iodic, Nitrous, Periodic, o-Phosphoric, Phosphorous, Pyrophosphoric, Selenic, Selenious, m-Selicic, o-Selicic, Sulfuric, Sulfurous, Telluric, Tellurous, Tetraboric, HF, HCl, HBr, HI, H$_2$SO$_3$, H$_2$SO$_4$, HNO$_2$, HNO$_3$, HFO, HFO$_2$, HFO$_3$, HFO$_4$, H$_5$FO$_6$, HClO$_2$, HClO$_3$, HClO$_4$, H$_5$ClO$_6$, HBrO$_2$, HBrO$_3$, HBrO$_4$, H$_5$BrO, HIO$_2$, HIO$_3$, HIO$_4$, H5IO$_6$, H$_2$SeO$_3$, H$_2$SeO$_4$, H$_3$PO$_3$, H$_3$PO$_4$, SO$_2$, HSO$_3^-$, H$_2$SO$_3$, HSO$_4^-$, H$_2$SO$_4$, H$_2$S$_2$O$_3$, HNO$_3$, NO$_2$, N$_2$O$_5$, HMnO$_4$, H$_2$Cr$_2$O$_7$, PCl$_3$, PCl$_5$, POCl$_3$, P$_4$O$_{10}$, H$_3$PO$_3$, H$_3$PO$_4$, HCN, HCNO, HNCO, HSCN, HSeCN, HTeCN, HN$_3$, HSCSN$_3$, H$_2$S, H$_2$Se, H$_2$Te, AlCl$_3$, FeCl$_3$, HSiO$_3$, H$_4$SiO$_4$, H$_6$Si$_2$O$_7$, BF$_3$-etherate, BCl$_3$, SnCl$_4$, H$_2$CO$_3$, and CO$_2$; and organic acids or acid precursors having the general formula:

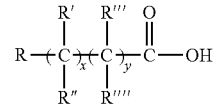

wherein x and y are integers between 0 and 20 inclusive, with the sum of x and y being an integer of 20 or less, wherein R is a functionality selected from the group consisting of substituted or unsubstituted aromatic hydrocarbon groups, branched or unbranched alkyl groups, the alkyl group having between 1 and 27 carbon atoms, and mixtures thereof, and wherein each variable R', R", R''' and R'''' is a functionality selected from the group consisting of hydrogen, amines, hydroxyl, phenyl, phenol radicals, and mixtures thereof, each of the above-mentioned R variable functionalities being chosen independently of the other R variable

Example 1

A solution is prepared comprising a sodium hypochlorite oxidizing agent. The sodium hypochlorite is maintained in an aqueous solution at a concentration between about 0.25% and 25% by volume. The inventive activator comprised of an inorganic acid, acids or inorganic acid precursors with optional organic acid or acids or synthetic equivalents thereof is added to the aqueous solution at a concentration 5% by volume. The solution is heated at or near boiling, and a box formed from expanded polyethylene is immersed in the heated solution for approximately one minute. The box is then painted with a base coat of RUST-OLEUM Premium Auto Primer—Fast Drying Formula. Several different paints are then coated over this base coat. The box is then subjected to repeated abuse being used by a plumber. After approximately 30 days, the paint is being stripped from primer as much as primer is being stripped from the surface of the tote box, as determined by the ASTM D3359-78 cross-hatch method defined hereinabove.

Example 2

A solution is prepared comprising a sodium hypochlorite oxidizing agent. The sodium hypochlorite is maintained in an aqueous solution at a concentration between about 0.25% and 25% by volume. The activator is added to the aqueous hypochlorite solution at a concentration of 2% by volume. The solution is heated at boiling, and an automotive A-pillar formed from polyethylene expanded foam is immersed in reactive vapor for approximately one minute. The automotive A-pillar is then painted with a base coat of RUST-OLEUM Premium Auto Primer—Fast Drying Formula. The automotive A-pillar is then subjected to repeated abuse by being suspended in a kitchen type dishwasher. After approximately 100 washings, the paint is still adhered to the automotive A-pillar, as determined by visual inspection.

Example 3

A solution is prepared comprising a sodium hypochlorite oxidizing agent. The sodium hypochlorite is maintained in an aqueous solution at a concentration between about 0.25% and 25% by volume. The activator is added to the aqueous solution at a concentration of 2.0% by volume. The solution is heated to about 60.degree. C., and door panels prepared from polypropylene were immersed in the heated solution for approximately two minutes. The treated pieces were painted with RUST-OLEUM Gloss Protective Spray Enamel, Gloss Black 7779. Adhesion was outstanding, as determined by the ASTM D3359-78 cross-hatch method defined in hereinabove.

Example 4

A solution is prepared comprising a sodium hypobromite oxidizing agent and is heated to about 60.degree. C., followed by addition of the inorganic activating agent. The sodium hypobromite is maintained in an aqueous solution at a concentration of about 2.62% by volume. The activator is maintained in the aqueous solution at a concentration of 1.5% by volume. Twelve pieces prepared from expanded polypropylene beads are immersed in the heated solution for approximately two minutes. The treated pieces are painted with RUST-OLEUM Gloss Protective Spray Enamel, Gloss Black 7779. The painted pieces are suspended from the upper rack of a dishwasher and run through 100 cycles on the "pots and pans" setting. Little to no loss in adhesion is noted, as determined by the ASTM D3359-78 cross-hatch method defined hereinabove.

Example 5

Expanded polyethylene pellets were placed in a treatment basket fabricated as follows: Six ~11 cm by ~2.5 cm openings were cut from a ~16 cm by ~8 cm PET jar with a ~5 cm wide screw cap. A piece of nylon window screen was cut to fit the height and circumference of the jar. The nylon screen was attached to the jar by setting the removed jar pieces on fire and dripping the melting PET onto the nylon-jar interfaces. Into the jar was poured expanded pellets to a level of ¾ full. The pellets were then treated by submerging under a 90° C. stirred bleach solution by vibrating vigorously with a push rod fashioned out of a polyethylene coat hanger while adding acetic anhydride, the ratio of reagents being those described in the hereinabove referenced Beholz patent. The pellets were then rinsed with copious amounts of water, removed from the jar and dried. A solution was prepared of polyurethane caulking (3M Marine Adhesive Sealant, Fast Cure 5200, Part Number 051135-05220, (Ingredients: Urethane Prepolymer (51447-37-1), Titanium Dioxide (13463-67-7), Zinc Oxide (1314-13-2), Diethylene Glycol Monoethyl Ether Acetate (112-15-2), P,P'-Methylenebis (Phenyl Isocyanate) (101-68-8), Synthetic Amorphous Silica, Fumed Crystalline Free (112945-52-5), Silica (7631-86-9), Alkyl Isocyanate Silane (85702-90-5), Acetone (67-64-1), Heptane (142-82-5), Diphenylmethane-2,4'Diisocyanate (5873-54-1), 1,1'-Methylenebis(Isocyanatobenzene) (26447-40-5, N-Butyl Acetate (123-86-4), Xylene (1330-23-7), Hexamethylene Diisocyanate (822-06-0)), 3M Marine, 3M Center, Building 223-6S-06, St. Paul, Minn. 55144-1000). The coating solution was approximately 10% PU in THF. A cup was then fashioned from a PE jar by cutting the bottom from the jar and drilling holes in the bottom that were smaller in diameter than the minimum pellet diameter. The cup was 2.5 cm deep by 4.5 cm in diameter. The cup was then filled with the treated pellets, suspended above a beaker and the PU solution poured through it. The application of the PU solution to the pellets was repeated once again after the first coat was mostly dry. The formed part was allowed to dry over night. The formed disk stilled smelled of THF but was removed from the cup by cutting the cup away from disk. The disk was then allowed to dry over a heat lamp for 8 hours and allowed to further dry at ambient temperature over night. Attempted separation of the pellets from the disk exhibited that the pellets were being broken upon removal indicating that good adhesion had been accomplished.

While preferred embodiments, forms and arrangements of parts of the invention have been described in detail, it will be apparent to those skilled in the art that the disclosed embodiments may be modified. Therefore, the foregoing description is to be considered exemplary rather than limiting, and the true scope of the invention is that defined in the following claims.

What is claimed is:

1. A method for improving adhesion characteristics of a polymeric material composed of a polymeric composition material containing at least one of expanded foam precursor material, the polymeric precursor material composed of expanded polyethylene pellets, the method comprising the steps of:

contacting expanded polyethylene pellets with a composition containing at least one oxidizing agent, wherein said oxidizing agent is a bivalent oxygen compound, wherein the bivalent oxygen compound is selected from the group consisting of a) halogenated oxycompounds selected from the group that includes oxycompounds of chlorine, oxycompounds of bromine, oxycompounds of iodine, b) oxycompounds of boron, c) oxycompounds of nitrogen and mixtures thereof, said oxidizing agent made present in a kinetically degrading state which produces at least one chemical intermediate reactive with a polymeric substrate in a controlled reaction mechanism, wherein the contacting step occurs at a temperature between about 20 degree C. and a temperature at which decomposition of the polymeric material commences, wherein the contacting step includes at least one of spraying a heated treatment mist onto the expanded polyethylene pellets spraying a mist onto the expanded polyethylene pellets and, dipping expanded polyetheylene pellets into a bath containing the composition;

maintaining contact between the expanded polyethylene pellets and the oxidizing agent composition for an interval sufficient to impart at least one functional groups derived from the oxidizing agent onto the polymeric precurser material; and reacting the oxidizing agent imparted into the resulting material with at least one activating agent, the activating agent containing at least one functionality capable of preferentially reacting with said oxidizing agent to produce at least one intermediate reactive with the resulting material, wherein the activating agent comprises at least one of an inorganic acid, an inorganic acid precursor, organic acids or derivatives thereof, the reaction step occurring in at least one of an aqueous environment, an anhydrous environment or a vaporous environment, the reaction step between the oxidizing agent and the activating agents occurring at a rate essentially equal to reaction between said polymeric material and the reaction intermediate;

contacting the treated expanded polyethylene pellets with a polymeric coating solution while the treated expanded polyetheylene pellets are maintained proximate to each other; and allowing the polymeric solution to thy to form a coated construct.

2. The method of claim 1 wherein said oxidizing agent is the bivalent oxygen halogenated oxycompound compound selected from the group consisting of:

oxycompounds of chlorine selected form the group consisting of at least one of hypochlorous acid, alkali metal salts of hypochlorous acid and hydrates thereof, alkaline earth metal salts of hypochlorous acid and hydrates thereof, perchloric acid, alkali metal salts of perchloric acid and hydrates thereof, chloric acid, alkali metal salts of chloric acid and hydrates thereof, and alkaline earth metal salts of chloric acid and hydrates thereof;

oxycompounds of bromine selected form the group consisting of at least one of including at least one of hypobromous acid, alkali metal salts of hypobromous acid and hydrates thereof, alkaline earth metal salts of hypobromous acid and hydrates thereof, bromic acid, and alkali and alkaline earth metal salts of bromic acid and hydrates thereof;

oxycompounds of iodine selected form the group consisting of at least one of including at least one of iodic acid, alkali and alkaline earth metal salts of iodic acid and hydrates thereof, periodic acid, and alkali and alkaline earth metal salts of periodic acid and hydrates thereof;

oxycompounds of boron including at least one of boric acid, alkaline earth and alkali metal salts and hydrates thereof, alkali perborates and hydrates thereof, and alkaline earth metal perborates and hydrates thereof; and oxycompounds of nitrogen including at least one of nitric acid and alkali and alkaline earth metal salts of nitric acid and hydrates thereof.

3. The method of claim 1 wherein the activating agent containing at least one functionality capable of preferentially reacting with said oxidizing agent to produce at least one intermediate reactive with the polymeric substrate is a polyprotic acid selected from the group consisting of: binary acids, Bronsted acids, hydrohalic acids, oxyacids such as hypohalous acids (HXO), Halous Acids (HXO$_2$), Halic Acids (HXO$_3$), Perhalic Acids (HXO$_4$), Paraperhalic Acids (H$_5$XO$_6$), Lewis acids, mineral acids, polyprotic acids, ternary acids, electrophiles, Arsenic, Arsenious, o-Boric, Carbonic, Chromic, Germanic, Hydrocyanic, Hydrogen Sulfide, Hydrogen Peroide, Hypobromous, Hypochlorous, Hypoiodous, Iodic, Nitrous, Periodic, o-Phosphoric, Phosphorous, Pyrophosphoric, Selenic, Selenious, m-Selicic, o-Selicic, Sulfuric, Sulfurous, Telluric, Tellurous, Tetraboric, HF, HCl, HBr, HI, H$_2$SO$_3$, H$_2$SO$_4$, HNO$_2$, HNO$_3$, HFO, HFO$_2$, HFO$_3$, HFO$_4$, H$_5$FO$_6$, HClO$_2$, HClO$_3$, HClO$_4$, H$_5$ClO$_6$, HBrO$_2$, HBrO$_3$, HBrO$_4$, H$_5$BrO, HIO$_2$, HIO$_3$, HIO$_4$, H5IO$_6$, H$_2$SeO$_3$, H$_2$SeO$_4$, H$_3$PO$_3$, H$_3$PO$_4$, SO$_2$, HSO$_3^-$, H$_2$SO$_3$, HSO$_4^-$, H$_2$SO$_4$, H$_2$S$_2$O$_3$, HNO$_3$, NO$_2$, N$_2$O$_5$, HMnO$_4$, H$_2$Cr$_2$O$_7$, PCl$_3$, PCl$_5$, POCl$_3$, P$_4$O$_{10}$, H$_3$PO$_3$, H$_3$PO$_4$, HCN, HCNO, HNCO, HSCN, HSeCN, HTeCN, HN$_3$, HSCSN$_3$, H$_2$S, H$_2$Se, H$_2$Te, AlCl$_3$, FeCl$_3$, FeBr$_3$, HSiO$_3$, H$_4$SiO$_4$, H$_6$Si$_2$O$_7$, BF$_3$, BF$_3$-etherate, BCl$_3$, SnCl$_4$, H$_2$CO$_3$, CO$_2$, and the like; and organic acid or acid precursors having the general formula:

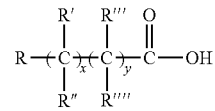

wherein x and y are integers between 0 and 20 inclusive, with the sum of x and y being an integer of 20 or less, wherein R is a functionality selected from the group consisting of substituted or unsubstituted aromatic hydrocarbon groups, branched or unbranched alkyl groups, the alkyl group having between 1 and 27 carbon atoms, and mixtures thereof, and wherein each variable R', R", R'" and R"" is a functionality selected from the group consisting of hydrogen, amities, hydroxyl, phenyl, phenol radicals, and mixtures thereof, each of the above-mentioned R variable functionalities being chosen independently of the other R variable functionalities, and wherein R" may also be selected from the group consisting of anhydrides, halide salts, selenic acid salts, perchloric acid salts, boric acid salts, and mixtures thereof; and wherein the dicarboxylic acid has the general formula:

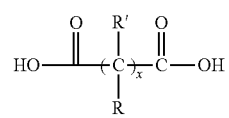

wherein x is an integer between 1 and 20 inclusive and R and R' are functionalities selected from the group consisting of hydrogen, hydroxyl radicals, amines, phenyl radicals and mixtures thereof.

4. The method of claim 3 wherein the oxidizing agent is maintained in an aqueous solution at a concentration between about 0.25% and 25% by volume, and wherein the activating agent is maintained in the aqueous solution at a concentration between about 0.2% and 10% by volume.

5. The method of claim 3 wherein the activating agent is selected from the group consisting of HCl, $H_2SO_4$, and mixtures thereof with or without an organic acid such as acetic acid or other organic acid.

6. The method of claim 3 wherein the activating agent is selected from the group consisting of an organic acid such as acetic acid or other organic acid, and mixtures thereof.

7. The method of claim 3 wherein the oxidizing agent is selected from the group consisting of sodium hypochlorite, calcium hypochlorite, calcium hypochlorite tetrahydrate, and mixtures thereof.

* * * * *